(12) United States Patent
Tanoue et al.

(10) Patent No.: US 8,565,964 B2
(45) Date of Patent: Oct. 22, 2013

(54) DRIVING EVALUATION METHOD

(75) Inventors: Seiichiro Tanoue, Nagasaki (JP);
Hidefumi Higuchi, Nagano (JP); Yurika Higuchi, legal representative, Nagano (JP); Kyoichi Higuchi, legal representative, Nagano (JP); Miori Suzuki, legal representative, Nagano (JP)

(73) Assignee: Luna Co., Ltd., Tokyo (JP)

( * ) Notice: Subject to any disclaimer, the term of this patent is extended or adjusted under 35 U.S.C. 154(b) by 0 days.

(21) Appl. No.: 13/392,011

(22) PCT Filed: Aug. 26, 2010

(86) PCT No.: PCT/JP2010/064435
§ 371 (c)(1),
(2), (4) Date: Apr. 20, 2012

(87) PCT Pub. No.: WO2011/024878
PCT Pub. Date: Mar. 3, 2011

(65) Prior Publication Data
US 2012/0221170 A1 Aug. 30, 2012

(30) Foreign Application Priority Data
Aug. 27, 2009 (JP) ................. 2009-196343

(51) Int. Cl.
*G06F 7/00* (2006.01)
(52) U.S. Cl.
USPC ..................... 701/33.4; 701/32.1
(58) Field of Classification Search
USPC .............. 701/29.1, 32.1, 32.5, 33.4
See application file for complete search history.

(56) References Cited

U.S. PATENT DOCUMENTS

| | | | | |
|---|---|---|---|---|
| 5,797,134 | A * | 8/1998 | McMillan et al. | 705/400 |
| 6,067,488 | A * | 5/2000 | Tano | 701/33.4 |
| 7,389,178 | B2 | 6/2008 | Raz et al. | |
| 7,937,278 | B1 * | 5/2011 | Cripe et al. | 705/4 |
| 8,090,598 | B2 * | 1/2012 | Bauer et al. | 705/4 |
| 2004/0183493 | A1 * | 9/2004 | Boisvert et al. | 318/469 |
| 2005/0131597 | A1 * | 6/2005 | Raz et al. | 701/29 |
| 2008/0125958 | A1 * | 5/2008 | Boss et al. | 701/123 |

(Continued)

FOREIGN PATENT DOCUMENTS

| EP | 0008927 A1 * | 3/1980 |
|---|---|---|
| JP | 2000-185676 A | 7/2000 |

(Continued)

OTHER PUBLICATIONS

International Search Report for PCT/JP2010/064435 dated Oct. 5, 2010.

(Continued)

*Primary Examiner* — Fadey Jabr
*Assistant Examiner* — Thomas Ingram
(74) *Attorney, Agent, or Firm* — Cook Alex Ltd.

(57) ABSTRACT

Disclosed is a driving evaluation method capable of properly evaluating an efficient driving mode corresponding to road conditions by way of using energy efficiency as a main perspective of evaluation. The driving evaluation method, on the basis of motion data (S2) of a mobile body, calculates an evaluation index and performs driving evaluation, and is characterized in obtaining, from the motion data, evaluation indices A, B, D, and E, which are functions of an acceleration energy Ei injected into the mobile body and a motion distance Li of the mobile body and which have a positive correlation with either one of the acceleration energy or the motion distance and a negative correlation with the other.

15 Claims, 14 Drawing Sheets

(56) References Cited

U.S. PATENT DOCUMENTS

| | | |
|---|---|---|
| 2008/0234876 A1* | 9/2008 | Harumoto et al. ............ 701/1 |
| 2008/0300731 A1 | 12/2008 | Nakajima et al. |
| 2008/0319665 A1* | 12/2008 | Berkobin et al. ............ 701/213 |
| 2009/0043428 A1* | 2/2009 | Matsunaga et al. ............ 701/1 |
| 2009/0222338 A1* | 9/2009 | Hamilton et al. ............ 705/14 |
| 2009/0265060 A1 | 10/2009 | Shibasaki |
| 2009/0318121 A1* | 12/2009 | Marumoto ............ 455/414.1 |
| 2010/0047744 A1* | 2/2010 | Miura ............ 434/66 |
| 2010/0129064 A1 | 5/2010 | Maeda et al. |

FOREIGN PATENT DOCUMENTS

| | | | |
|---|---|---|---|
| JP | 3593502 B2 | | 11/2004 |
| JP | 2007-015497 A | | 1/2007 |
| JP | 2007-065997 A | | 3/2007 |
| JP | 2007-210487 A | | 8/2007 |
| JP | 2007-233731 A | | 9/2007 |
| JP | 2008-298979 A | | 12/2008 |
| JP | 2009-031046 A | | 2/2009 |
| JP | 2009031046 A | * | 2/2009 |
| JP | 2010-160814 A | | 7/2010 |
| JP | 2010-186482 A | | 8/2010 |
| WO | WO2006/008731 A1 | | 1/2006 |
| WO | WO2007/052535 A1 | | 5/2007 |

OTHER PUBLICATIONS

International Search Report for PCT/JP2010/064435 dated Oct. 5, 2010 (second sheet and continuation of second sheet).

* cited by examiner

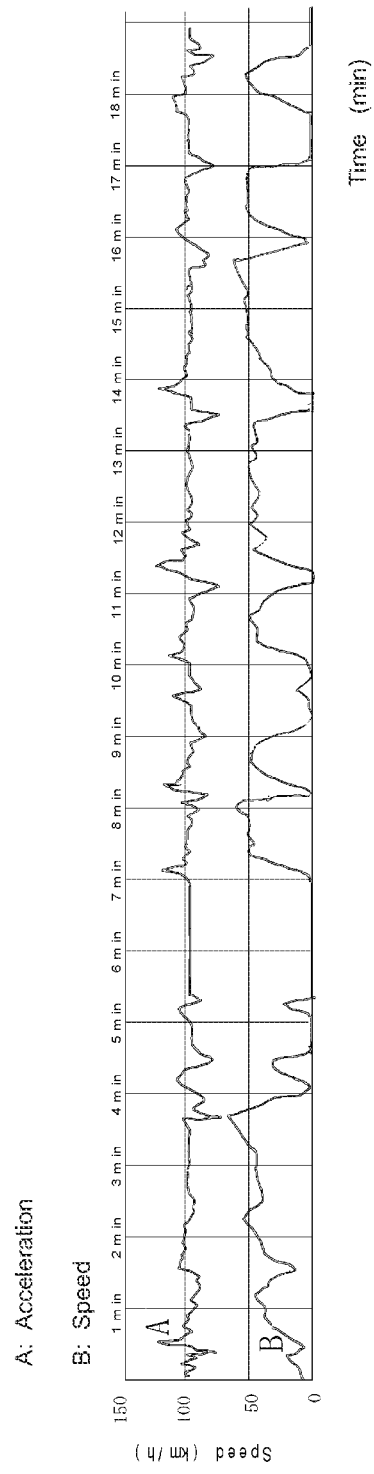

DRIVING EVALUATION METHOD

TECHNICAL FIELD

The present invention relates to a driving evaluation method, especially to a preferred driving evaluation method when speed control is performed in a driving operation.

BACKGROUND ART

In general, trials for improving operational efficiency are performed by evaluating the quality of driving a car or the like, to improve fuel consumption and to reduce accident rates in the transportation industry or the like. Driving evaluation methods which derive action data showing specific actions corresponding to sudden acceleration, sudden deceleration, sudden turn of a steering wheel, and the like, on the basis of driving data (such as speed data, acceleration data, and angular acceleration data) obtained from sensors and the like mounted on a vehicle are known as such driving evaluation methods. In addition, a technology for performing driving evaluation by using actual driving action data based on driving data and estimated action data based on road configuration data is known in such a type of driving evaluation technologies (Refer to following Patent Document 1 and 2).

On the other hand, a technology for performing driving evaluation by deriving smooth appropriate speed data denoting an ideal driving condition on the basis of actual speed data and comparing the appropriate speed data to actual speed data is proposed (e.g., refer to the following Patent Document 3). In this technology, a Fourier transformation is performed on the actual speed data to obtain a smooth curve composed of the sum of trigonometric functions as the above-described appropriate speed data, and driving evaluation is performed on the basis of a degree of divergence of the both data.

PRIOR ART TECHNOLOGY

Patent Documents

[Patent Document 1] Japanese Patent Publication No. 3593502
[Patent Document 2] Japanese Unexamined Patent Publication No. 2008-298979
[Patent Document 3] Japanese Patent Publication No. 3944549

SUMMARY OF THE INVENTION

Problems to be Solved by the Invention

However, the above-described conventional systems for performing driving evaluation by extracting a particular action have problems that the systems cannot evaluate smoothness of the overall driving flow, smooth driving mode resulting from predictive driving in particular, since the respective particular actions are judged based on a predetermined reference to integrate and evaluate the judged result; and effective driving operation carried out while predicting traffic flow cannot be promoted since the particular action exceeding a predetermined reference can be reduced and a judgment score can be improved by basically avoiding sudden operations such as sudden turn of a steering wheel, sudden acceleration, sudden deceleration, and the like. In addition, there are more problems that it is difficult to set a reference value (threshold value) for defining a particular action and the reference value changes the evaluation significantly. For example, since the particular action is reflected or not reflected in the evaluation in the vicinity of the above-described threshold value, when the threshold value is between two driving operations, the difference between the two driving operations makes a slight difference between the two evaluations large, and when the two driving operations are less than a threshold value, even when there is a large difference between the driving modes of the driving operations, the large difference is not reflected in the evaluation.

On the other hand, a system for performing driving evaluation by comparing the actual speed data and the appropriate speed data can evaluate the smoothness of the overall driving flow while adopting an effect of existence or nonexistence of the above-described particular action to a certain extent, so that efficiency of the overall running data of the predictive drive can be evaluated to a certain extent. However, even this system has a problem that in some cases, effective driving operation cannot always be promoted. Because basically as described above, the judgment score results in being improved by means of only avoiding sudden operations and raising the smoothness of driving and the judgment score can be improved by carrying out driving operation slowly with efficiency ignored. Also, there is a problem of a method for forming the appropriate speed data that the evaluation changes significantly depending on how close the appropriate speed data is brought to the actual speed data. Furthermore, this system must basically treat driving actions in a high speed range and low speed range equally. But since divergence between the actual speed data and the appropriate speed data becomes large in the low speed range where speed variation is large and speed fluctuation occurs frequently, the driving evaluation is greatly influenced by change of speed range in running time and there is a risk that an appropriate and fair driving evaluation cannot be performed. In particular, since the actual speed data when starting and stopping are originally discontinuous and divergence from the appropriate speed data becomes large, in actuality, data in a range of 20 km/h or less must be excluded from the driving evaluation. When this is done, there are problems that the driving evaluation on a traffic congested street cannot be performed, and so on.

Further, a method for performing driving evaluation by considering the number of revolutions of the engine exists as a method for performing driving evaluation of a vehicle. However, effective running cannot always be realized in an actual road environment since a particular shift operation, for example, an event which performs driving evaluation by use of an operation system to shift up at a low number of revolutions of the engine earlier than usual, can be done and then high evaluation is obtained. On the other hand, in some cases, driving evaluation is performed by measuring a fuel consumption rate. In this case, the total fuel consumption evaluation system does not evaluate driving operation for improving fuel consumption, and only shows a result, so that it is difficult to promote effective driving. Moreover, a system evaluating an instantaneous moment fuel consumption can only make a direct determination at each point of time for a driving condition, so that operational efficiency by an overall driving pattern cannot be determined.

Therefore, the present invention solves the above-described problems. The object of the present invention realizes a driving evaluation method which can properly evaluate an effective driving mode corresponding to the condition of a road, by use of energy efficiency as a principal viewpoint.

Means for Solving the Problem

In consideration of the actual conditions, one driving evaluation method of the present invention calculates an evaluation index on the basis of motion data (S1, S2) of a mobile body, to perform a driving evaluation. In the driving evaluation method, an evaluation index (A, B, D, E) is calculated from the motion data, in which the evaluation index (A, B, D, E) is a function of an acceleration energy (Ei) injected to the mobile body and a motion distance (Li) of the mobile body corresponding to the acceleration energy (Ei), and has a positive correlation to either one of the acceleration energy and the motion distance, and has negative correlation to the other.

The invention can perform objective driving evaluation of a driving mode based on energy efficiency, since it can be reflected in the evaluation index how long a distance the mobile body can move with a predetermined acceleration energy, in other words, how much acceleration energy is injected for the mobile body to move a predetermined distance. That is, the evaluation index can determine the degree of an energy efficiency of the overall moving pattern with a motion distance of a mobile body as a standard (e.g., an index A described below), a required energy amount for a predetermined motion distance (e.g., an index B), degrees of acceleration/deceleration magnitude and an acceleration/deceleration frequency at an energy base (e.g., indices C, C1, C2), a ratio of the degree of acceleration magnitude and an acceleration frequency, to the degree of deceleration magnitude and a deceleration frequency (e.g., an index G), a useless (excess) injected energy amount for a predetermined motion distance (e.g., an index D), a combination of these respective indices (sum or ratio, e.g., index E), or the like. In particular, the evaluation index (A, B) is preferably the function in proportion to or inverse proportion to the acceleration energy (Ei).

A first driving evaluation method of the present invention calculates an evaluation index on the basis of motion data (S1, S2) of a mobile body, to perform a driving evaluation. In the driving evaluation method, one moving segment is from a start of the mobile body to a first stop. An acceleration energy efficiency index (A) denoting a ratio of a kinetic energy (Emi) of the mobile body having an average moving speed (Vmi) in the moving segment to an acceleration energy (Ei) injected into the mobile body in the moving segment, or an additional value or multiplication value of a positive or negative constant to the ratio, is calculated from the motion data.

In one embodiment of the present invention, the acceleration energy efficiency index throughout a plurality of the moving segments is calculated by the sum of acceleration energy efficiency indices on the plurality of the moving segments which are weighted by motion distances of the mobile body in the moving segments as weighting factors. This makes available a total index value regarding the motion data having the plurality of the moving segments.

In another embodiment of the present invention, the acceleration energy efficiency index (A) is calculated by using a motion distance correction factor ($X_L$) for reducing an influence on the acceleration energy efficiency index (A) from the motion distance (Li) at least in a range the motion distance (Li)≥a predetermined value or ≤the predetermined value. Since this can reduce the influence on the acceleration energy efficiency index (A) from the motion distance (Li), evaluation fluctuation originated from differences between traffic environments, for example: between an open road and expressway or with or without traffic congestion, can be reduced. In order to reduce influence on an acceleration energy efficiency index from a motion distance, correction by using the motion distance correction factor ($X_L$) is preferably used in the overall range of the motion distance. However, since the acceleration energy efficiency index generally has a positive or negative correlation with respect to motion distance, in the sense that correction is performed in a range of large motion distance by setting a small motion distance to a standard, an acceleration energy efficiency index may be corrected in a range where a motion distance is a predetermined value or larger, or in the sense that correction is performed in a range of small motion distance by setting a large motion distance to a standard, an acceleration energy efficiency index may be corrected in a range where a motion distance is a predetermined value or smaller. As a specific mode, for example, a quantity with a kinetic energy (Emi) multiplied by a motion distance correction factor ($X_L$), in which the motion distance (Li) has a positive correlation to the motion distance (Li) (a relationship in which influence on a motion distance to the index is generally reduced by collection), can be used for the above-described acceleration energy efficiency index at least in a range≥a predetermined value or ≤the predetermined value, instead of a kinetic energy (Emi) of the mobile body having the average moving speed (Vmi).

A second driving evaluation method of the present invention calculates an evaluation index on the basis of motion data (S1, S2) of a mobile body, to perform a driving evaluation. In the driving evaluation method, an acceleration energy consumption index (B) denoting a ratio of an acceleration energy (Ei) injected into the mobile body to a motion distance (Li) of the mobile body, or an additional value or multiplication value of a positive or negative constant to the ratio, is calculated from the motion data. This can provide an evaluation index corresponding to an acceleration energy consumption rate per unit motion distance. This evaluation index is not obtained from a measurement of actual fuel consumption, and denotes efficiency for transfer of energy necessary to moving pattern. Therefore, the degree of performance for a moving pattern appropriate to energy saving can be grasped.

In one embodiment of the present invention, one moving segment is from a start of the mobile body to a first stop. A ratio of the acceleration energy (Ei) in the moving segment to a motion distance (Li); or when there are a plurality of moving segments, their sum; or an additional value or multiplication value of a positive or negative constant to the ratio or their sum: are calculated as the acceleration energy consumption index (B).

A third driving evaluation method of the present invention calculates an evaluation index on the basis of motion data (S1, S2) of a mobile body, to perform a driving evaluation. In the driving evaluation method; a sudden acceleration index (C1) or sudden deceleration index (C2) denoting a ratio of a sudden acceleration operation amount or sudden deceleration operation amount, to a motion distance (Li) of the mobile body; or an additional value or multiplication value of a positive or negative constant to the ratio, are obtained from the motion data. The sudden acceleration operation amount or the sudden deceleration operation amount denoting; a ratio of an acceleration energy (Eij) injected at one or a plurality of acceleration regions or a deceleration energy (Fij) ejected at one or a plurality of deceleration regions, to an acceleration distance (Lij) or a deceleration distance (Lik) corresponding to it; or a sum of the ratios when there is a plurality of acceleration regions or deceleration regions. This allows an evaluation corresponding to acceleration/deceleration magnitude and an acceleration/deceleration frequency to be performed without preparing a reference value (threshold value).

In one embodiment of the present invention, one moving segment is from a start of the mobile body to a first stop. The sudden acceleration index (C1) denoting a ratio of the sudden acceleration operation amount in the moving segment to the motion distance (Li) or a sum of the ratios when there is a plurality of moving segments; the sudden deceleration index (C2) denoting a ratio of the sudden deceleration amount in the moving segment to the motion distance (Li) or a sum of the ratios when there is a plurality of moving segments; or a sudden acceleration/deceleration index (C) denoting a sum of the sudden acceleration index and the sudden deceleration index: is calculated.

A fourth driving evaluation method of the present invention calculates an evaluation index on the basis of motion data (S1, S2) of a mobile body, to perform a driving evaluation. In the driving evaluation method, one moving segment is from a start of the mobile body to a first stop. In one or a plurality of moving segments, an acceleration energy waste index (D) denoting a ratio of a difference value (Ei−Emi) where an acceleration energy (Ei) is injected into the mobile body in the moving segment and a kinetic energy (Emi) of the mobile body has the average moving speed (Vmi) in the moving segment, to a motion distance (Li) of the mobile body, or a sum of the ratios when there is a plurality of moving segments, or an additional value or multiplication value of a positive or negative constant to the ratio or their sum: is calculated from the motion data. Even in this case, a motion distance correction factor ($X_L$) for reducing an influence of the motion distance (Li) on the acceleration energy waste index (D) can be used at least in a range where the motion distance (Li) is a predetermined value or more, or the predetermined value or less. For example, the above-described acceleration energy waste index can use a multiplication result of a kinetic energy (Emi) and a motion distance correction factor ($X_L$) instead of a kinetic energy (Emi) of the mobile body having the average moving speed (Vmi), where the motion distance correction factor ($X_L$) has a positive correlation to the motion distance (Li) (a relationship in which influence on a motion distance is generally reduced by correction) to the motion distance (Li) at least in a range of the motion distance (Li)≥a predetermined value or the motion distance (Li)≤the predetermined value.

A fifth driving evaluation method of the present invention calculates an evaluation index on the basis of motion data (S1, S2) of a mobile body, to perform a driving evaluation. In the driving evaluation method, one moving segment is from a start of the mobile body to a first stop. In one or a plurality of moving segments, an acceleration energy waste index (D) denoting a ratio of a difference value (Ei−Emi) where an acceleration energy (Ei) is injected into the mobile body in the moving segment and a kinetic energy (Emi) of the mobile body has the average moving speed (Vmi) in the moving segment, to a motion distance (Li) of the mobile body, or a sum of the ratios when there is a plurality of moving segments, or an additional value or multiplication value of a positive or negative constant to the ratio or their sum; a sudden acceleration/deceleration index (C) in one or the plurality of moving segments denoting a sum of a sudden acceleration operation amount indicating a ratio of an acceleration energy (Eij) injected in an acceleration region to an acceleration distance (Lij), and a sudden deceleration operation amount indicating a ratio of a deceleration energy (Fij) ejected in a deceleration region to a deceleration distance (Lik), or an additional value or multiplication value of a positive or negative constant to a sum of the sudden acceleration operation amount and the sudden deceleration operation amount; a sum of the sudden acceleration/deceleration index (C) and the acceleration energy waste index (D), is calculated from the motion data, wherein the sum (C+D) is an appropriate driving index (E). Even in this case, a motion distance correction factor ($X_L$) for reducing an influence of the motion distance (Li) on the appropriate driving index (E) can be used at least in a range where the motion distance (Li) is a predetermined value or more, or the predetermined value or less. For example, in the above-described appropriate driving index, a quantity with a kinetic energy (Emi) multiplied by a motion distance correction factor ($X_L$), which has a positive correlation to the motion distance (Li) (a relationship in which an influence on a motion distance is generally reduced by correction), can be used at least in a range≥a predetermined value or ≤the predetermined value instead of a kinetic energy (Emi) of the mobile body having the average moving speed (Vmi).

A sixth driving evaluation method of the present invention calculates an evaluation index on the basis of motion data (S1, S2) of a mobile body, to perform a driving evaluation. In the driving evaluation method; a sudden acceleration operation amount denoting a ratio of an acceleration energy (Eij) injected at one or a plurality of acceleration regions to an acceleration distance (Lij) corresponding to it; or a sum of their ratios when there is a plurality of acceleration regions; a sudden deceleration operation amount denoting a ratio of a deceleration energy (Fij) ejected at a one or a plurality of deceleration regions, to a deceleration distance (Lik) relating to a deceleration operation corresponding to it; or a sum of the ratios when there is a plurality of deceleration regions; an acceleration/deceleration comparison index (G) denoting a ratio of the sudden acceleration operation amount to the sudden deceleration operation amount, or an additional value or multiplication value of a positive or negative constant to the ratio: are obtained from the motion data.

In addition, "ratio of P to Q" (P, Q: arbitrary parameter) means either of P/Q and Q/P.

Effects of the Invention

The present invention achieves an excellent effect in which a driving evaluation method capable of properly evaluating a driving mode corresponds to the condition of a road by use of energy efficiency as a principal viewpoint.

BRIEF DESCRIPTION OF THE DRAWINGS

FIG. 17 A chart showing actual driving data 7.

BEST MODE FOR CARRYING OUT THE INVENTION

Figure 1:
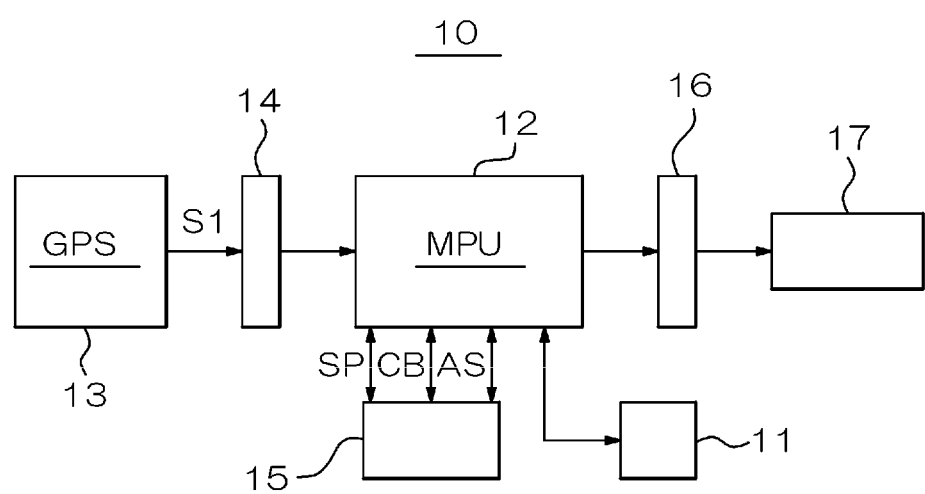
FIG. 1 An overall structure block diagram of a driving evaluation system for realizing embodiments of the driving evaluation method of the present invention.
Figure 2:
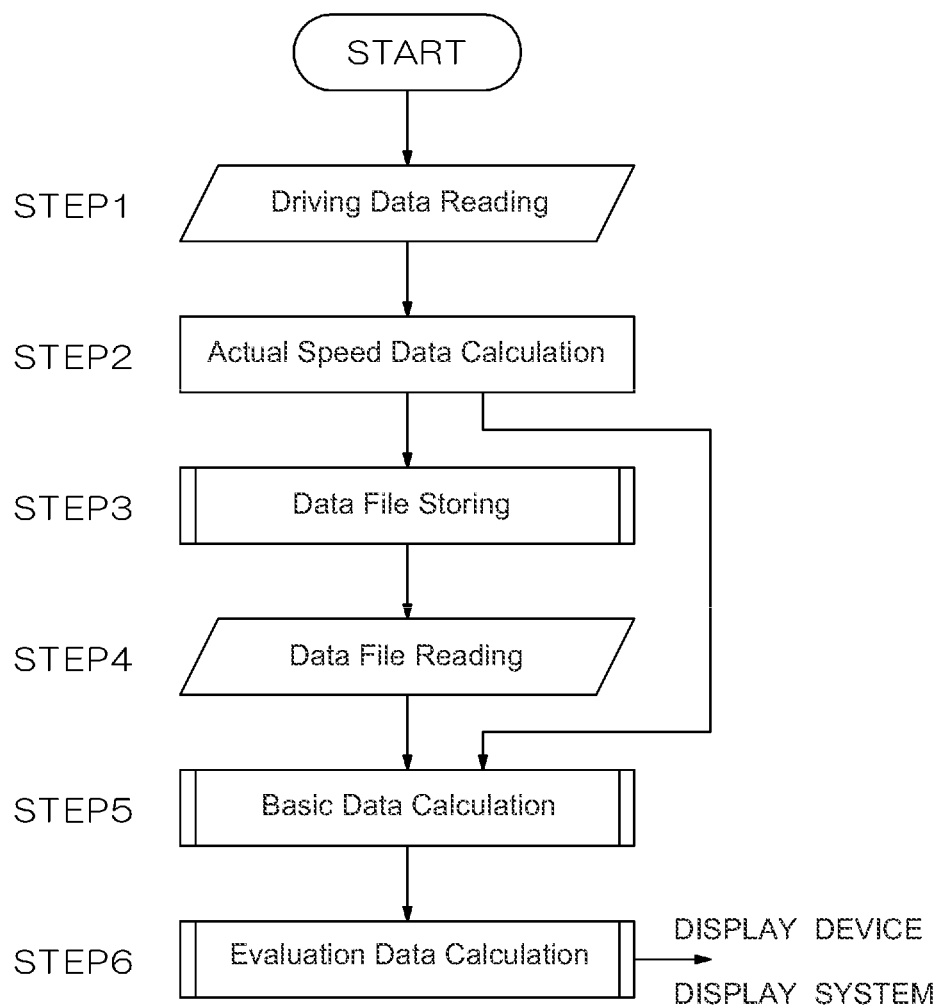
FIG. 2 A summary flow chart showing procedures of the embodiment.

Next, an embodiment of the present invention is explained in detail by referring to the attached drawings. FIG. 1 is an overall structure block diagram for showing an example of the configuration of a driving evaluation system to realize an embodiment relating to a driving evaluation method of the present invention, and FIG. 2 is a summary flow chart for showing an example of procedures of the embodiment.

Figure 3:
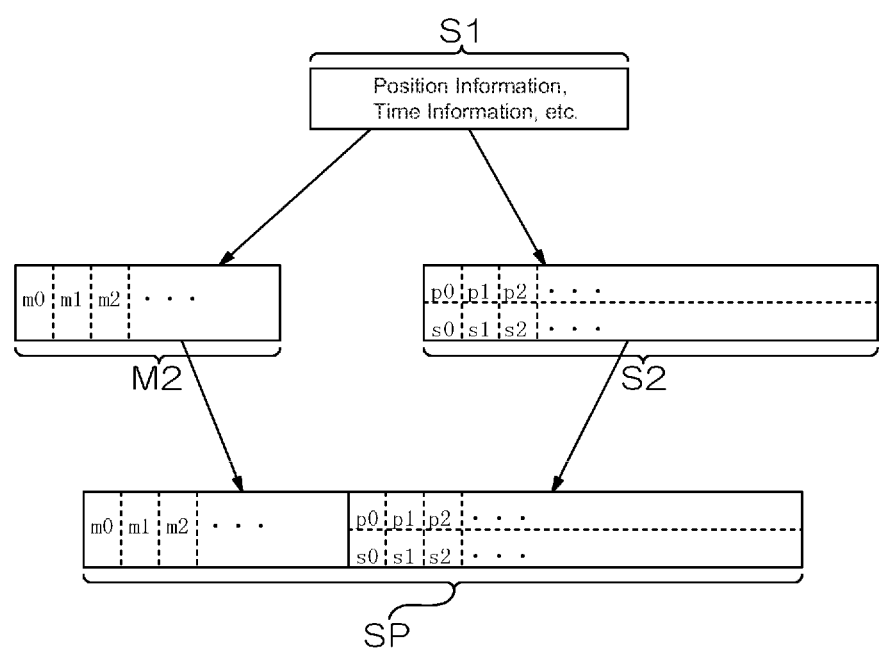
FIG. 3 A chart for schematically illustrating a relationship and a data structure of various data of the embodiment.

A driving evaluation system 10 of the embodiment is configured so that driving evaluation is performed by an MPU (microprocessor unit) performing various calculations and processings based on an operation program stored in a system memory 11. An MPU 12 reads a variety of data and performs processings. As an example, the MPU 12 inputs driving data S1 (position information, time information, and so on) output from a GPS (Global Positioning System) 13 prepared beforehand in a system via an input circuit 14 (STEP1), obtains actual speed data S2 on the basis of the driving data S1 (STEP2), and stores the data in a recorder 15 together with management data M2 such as date, time, driver's name (STEP3). As shown in FIG. 3 as an example, a speed data elementary file SP of actual speed data S2 with management data M2 added is created and recorded. The actual speed data S2, for example, includes status flags p0, p1, p2, ... as a series for every unit time and showing existence or nonexistence of GPS reception, and actual speed value s0, s1, s2, ... as a series for every unit time corresponding to the former. Also, the management data M2 includes index, date, time, and others of a target driver and a target vehicle. Further, the management data M2 may be stored as a file name of the above-described speed data elementary file SP. The actual speed data S2 shown in an illustration example is data substantially showing the relationship between speed and time. The above-described driving data S1 and actual speed data S2 correspond to the motion data of the present invention. The above-described step is a pre-process step for preparing data processing.

However, in another embodiment than the present embodiment, it may be configured that the GPS 13 is not prepared in the driving evaluation system 10, and instead the driving data S1 is read from an external recorder. In addition, in this case, it may be configured that actual speed data S2 is read directly from the outside, or a speed data elementary file SP of the actual speed data S2 with the above-described management data M2 added is read directly from the outside. Further, storing (STEP 3) and reading (STEP 4) of the speed data elementary file SP can be omitted, to execute the next process.

The above-described speed data elementary file SP is again read by the MPU12 (STEP 4), and basic data CB is calculated based on the actual speed data S2 in it (STEP 5). This basic data CB becomes basic values when evaluation data are calculated, such as: driving period, traveling distance, and average speed for the overall data; driving period, traveling distance Li, and average speed Vmi for each traveling segment i; and acceleration period or deceleration period, acceleration distance Lij or deceleration distance Lik for acceleration region j and deceleration region k in each traveling segment i. The above-described is a basic data extraction step for preparing basic data to calculate the evaluation data. The basic data CB is stored in the recorder 15. Then, evaluation data AS composed of the overall evaluation index (described below), evaluation indices of the respective traveling segments, and evaluation indices classified respectively by their average speed bands or the like are calculated by using the basic data CB (STEP6). This is a step for calculating the evaluation data from the basic data. The evaluation data AS is stored in the recorder 15 again as needed. The evaluation data AS is output via an output circuit 16 to an output device 17 such as a display, a printer, or a speaker. The output device 17 may be anything which can simply notify a user of the evaluation data AS by any method, the output device may even display the evaluation data AS in a mode so as for the evaluation data AS to be easily recognized by a display system based on the processing of the MPU 12, or in various modes by an external processing system such as a management system. An example of the display mode of the output device 17 is described below.

Next, the general concept and its meaning of the evaluation data AS used in the present embodiment are explained. Evaluation data of the present invention is an evaluation index which shows how high efficiently a work is performed by a kinetic energy obtained by an operation target depending on a driving operation. Here, an operation target of driving operation is a vehicle in the present embodiment, where a case that operation of the operation target or a mode of work is running of the vehicle is explained, but mobile bodies as the operation target of the present invention are not restricted to a vehicle such as a car or a train, and may be various traveling machines for example, a ship or a plane other than vehicles.

Viewpoint of the evaluation index used in the present embodiment is how efficiently a kinetic energy obtained by a vehicle is used to move the vehicle. In this case, when a vehicle stops once, then the kinetic energy of the vehicle is lost perfectly. Therefore, a period of time from when the vehicle starts to when the vehicle stops first is set as one moving segment (corresponding to a transfer segment of the present invention) and calculation is performed for every traveling segment. The evaluation index of the present embodiment has a configuration which allows the evaluation index to be calculated with a plurality of traveling segments synthesized but which also allows its basic value to be calculated in one traveling segment.

Figure 5:
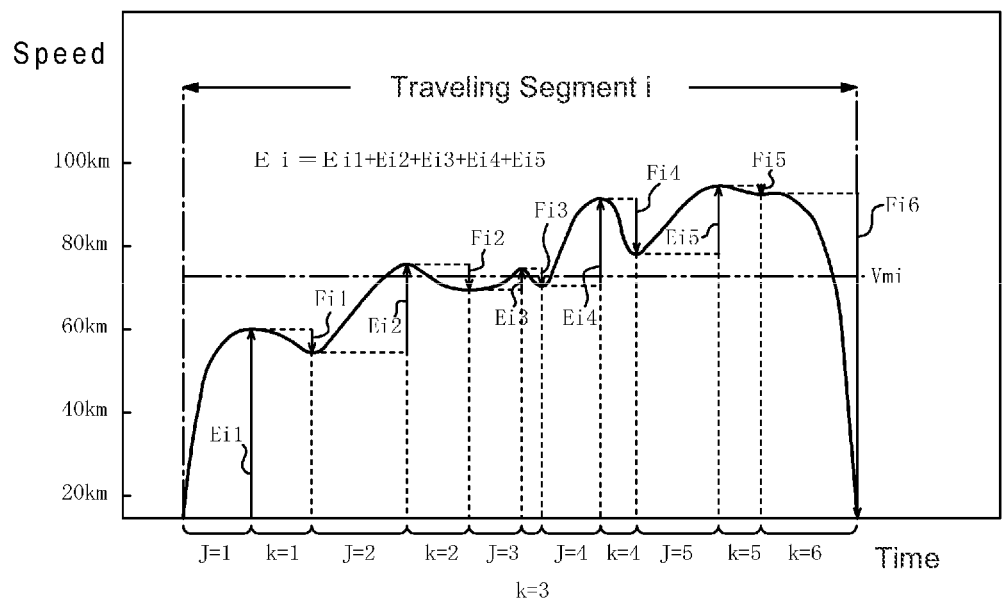
FIG. 5 An explanation diagram for showing fundamental parameters to calculate an evaluation index in a traveling segment.

FIG. 5 shows an example of one traveling segment i. A traveling segment i is the period of time from when the vehicle starts at one point of time to when the vehicle stops first, and speed distribution in the period shows various modes in driving pattern. In one traveling segment i, there is one or a plurality of acceleration regions j where a speed increases continuously, and one or a plurality of deceleration regions k where a speed decreases continuously, and also a constant speed region, not shown in the illustration example, where a speed is maintained at constant can exist. Further in the figure, arrows Ei1~Ei5 show acceleration energy injected to increase a vehicle speed in the respective acceleration regions j, and arrows Fi1~Fi6 show deceleration energy ejected to decrease a vehicle speed in the respective deceleration regions k. Also, an average speed in a traveling segment i is shown by Vmi. Further, a total acceleration energy in a traveling segment i is shown by Ei.

A first evaluation mode (index) as an evaluation index used in the embodiment is an index showing an acceleration energy injected by acceleration action of an operation target with an ideal energy value as a reference, and is referred to as an acceleration energy efficiency index A in the present embodiment. This acceleration energy efficiency index A shows a ratio of an acceleration energy injected in an actual driving pattern to a reference value of acceleration energy in vehicle driving. Concretely, when a vehicle moves the overall traveling distance at an average speed, the condition is an ideal condition (numerical value=1), and a ratio of an acceleration energy necessary in practice to an acceleration energy necessary in the ideal condition is obtained. This is based on an idea that a low evaluation is given to a driving pattern consuming a large amount of acceleration energy and a high evaluation is given to a driving pattern consuming less useless acceleration energy.

The acceleration energy efficiency index A of the embodiment is expressed by the following formula 1.

$$A = \sum_{i=1}^{n}[(Ei/Emi) \times Li] \bigg/ \sum_{i=1}^{n} Li \qquad \text{[Formula 1]}$$

Here, Ei is an actual acceleration energy in the i-th traveling segment (i is a natural number from 1 to n) i.e. traveling segment i, in other words, the sum total of acceleration energy Eij injected in acceleration region (time region where acceleration is generated continuously) j (j is a natural number from 1 to m) in the traveling segment i, and expressed by the following formula 2. n is total segment number.

$$Ei = \sum_{j=1}^{m} Eij \qquad \text{[Formula 2]}$$

Here, $Eij=M \cdot (Vbj^2-Vaj^2)=M \cdot \Delta V^2$ is a kinetic energy obtained by a vehicle from acceleration start to acceleration end in a acceleration region j of the traveling segment i. In addition, Vaj is initial speed at acceleration start, and Vbj is final speed at acceleration end. Further, M is a vehicle mass.

Furthermore, Emi is an acceleration energy corresponding to the average speed Vmi (equivalent to a kinetic energy when a traveling speed of a vehicle is an average speed Vmi, that is, an acceleration energy necessary for acceleration from a stationary condition to the condition of the average speed Vmi.) in the traveling segment i, and is shown by the following formula 3 with the average speed Vmi of the traveling segment.

$$Emi=M \cdot Vmi^2 = M \cdot (Li/ti)^2 \qquad \text{[Formula 3]}$$

Moreover, Li is the overall traveling distance of the traveling segment i. Then, ti is the overall driving period. In addition, the above-described formulae are based on the assumption that the number of the traveling segments is n. However, even when the number of the traveling segments is 1, if it is n=1, an acceleration energy efficiency index A can be obtained. This acceleration energy efficiency index A has a positive correlation (proportional relationship) with the injected acceleration energy Ei, and has a negative correlation (inverse proportional relationship) with the traveling distance Li.

Higher energy efficiency is nearer to 1 of the above-described acceleration energy efficiency index A, and for example, in an actual driving condition, the acceleration energy efficiency index A shows the degree of jerky driving caused by a lack of distance between cars and a driving pattern at too high a speed by a numerical value. That is, the acceleration energy efficiency index A shows how many times of acceleration energy in a case of running at a constant ideal speed (average speed) is injected, and as its numerical value becomes smaller (nearer to 1), the driving pattern becomes more ideal. The reference value of the acceleration energy efficiency index A is an acceleration energy Emi corresponding to the average speed Vmi in the above example, but is not necessarily restricted to this value, and may be positive constant number times of Emi, for example.

Next, a second evaluation mode (index) used in the embodiment is an index showing energy injected by acceleration action per unit motion distance of the operation target and is referred to as an acceleration energy consumption index B in the present embodiment. This acceleration energy consumption index B shows an injection amount of acceleration energy per unit traveling distance. The acceleration energy consumption index B of the embodiment is shown by the following formula 4.

$$B = \sum_{i=1}^{n}[Ei] \bigg/ \sum_{i=1}^{n} Li \qquad \text{[Formula 4]}$$

This acceleration energy consumption index B generally has a positive correlation with a fuel consumption rate and a smaller index value corresponds to a driving pattern of a mode for better fuel consumption. However, this index B does not show actual fuel consumption itself, but shows how a driving pattern is generally suitable for fuel consumption reduction. Therefore, since it is understood that the smaller the acceleration energy consumption index B is the more appropriate for fuel consumption reduction, it is more preferable than a case for evaluation by measuring actual fuel consumption, because evaluation of the driving pattern itself can be performed. A driving pattern suitable for the above-described fuel consumption reduction is generally a driving pattern with which a car can be driven for as long a distance as possible by a kinetic energy obtained by one acceleration. This index B has a positive correlation with (with proportional relationship to) the injected acceleration energy, and has a negative correlation with (with inverse proportional relationship to) the traveling distance.

Next, a third evaluation mode (index) used in the embodiment is an evaluation index showing a number of sudden acceleration actions and sudden deceleration actions per unit traveling distance of an operation target, and is referred to as sudden acceleration/deceleration index C in the present embodiment. This sudden acceleration/deceleration index C is shown by an injection degree (actually, a magnitude of acceleration rate and acceleration frequency) of useless acceleration energy per unit traveling distance and an ejection degree (actually, a magnitude of deceleration rate and deceleration frequency) of useless energy per unit traveling distance. The sudden acceleration/deceleration index C of the embodiment is expressed by the following formula 5. This index C becomes smaller, the smaller the number of unnecessary acceleration/deceleration operations, as the distance between cars is sufficiently secured and predictive driving is achieved.

$$C = \sum_{i=1}^{n}\sum_{j=1}^{m}[Eij/Lij] \bigg/ \sum_{i=1}^{n} Li + \sum_{i=1}^{n}\sum_{k=1}^{l}[Fik/Lik] \bigg/ \sum_{i=1}^{n} Li \qquad \text{[Formula 5]}$$

Here, in the first term of formula 5, as described above, Eij is an acceleration energy of acceleration region j in a segment i, and is expressed by the following formula 6. Here, Vaj is a speed at acceleration start in acceleration region j, and Vbj is a speed at acceleration end in acceleration region j. In addition, Lij is an acceleration distance (traveling distance in an acceleration region) in acceleration region j. In addition, in the second term, Fik is a deceleration energy of deceleration region k in a segment i, and is expressed by the following formula 7. Here, Vak is a speed at a deceleration start in deceleration region k, and Vbk is a speed at a deceleration end in the deceleration region k. In addition, Lik is a deceleration distance (traveling distance in deceleration region) in deceleration region k. Further, at least either one of the first term or the second term of the above-described index C may be obtained separately. That is, sudden acceleration index C1 given by only the first term shows a degree of sudden acceleration, and sudden deceleration index C2 given by only the second term shows a degree of sudden deceleration.

$$Eij = M \cdot (Vbj^2 - Vaj^2) \quad \text{[Formula 6]}$$

$$Fik = M \cdot (Vak^2 - Vbk^2) \quad \text{[Formula 7]}$$

In the embodiment, the degree of injection coefficient of acceleration energy in the a driving pattern, a consumption amount of acceleration energy per unit traveling distance of a driving pattern, an acceleration/deceleration amount of per unit traveling distance of a driving pattern, and the number of acceleration/deceleration can be evaluated by the three above-described evaluation indices, that is, acceleration energy efficiency index A, acceleration energy consumption index B, and sudden acceleration/deceleration index C. These evaluation indices respectively provide driving evaluations focused on how efficiently kinetic energy of an operation target (vehicle) is used for moving (driving). In the above-described conventional method for extracting separate particular action, driving evaluation fluctuates by a change in a reference value (threshold value) as a reference when extracting the particular action, or in a method for using the above-described conventional appropriate speed data, driving evaluation fluctuates by a change in the obtaining method of the conventional appropriate speed data. In comparison to this, in the embodiment, it is used that the injection amount of acceleration energy to give a kinetic energy to an operation target and an evaluation index based on the ejected amount of deceleration energy to reduce the kinetic energy so that it is focused on the efficiency of energy injection/ejection to the operation target. Consequently, driving evaluation can be performed quantitatively without generating a defect by using the standard value of the above-described conventional method and a threshold value on forming appropriate speed data.

The embodiment also has an advantage that an influence on road conditions to the evaluation index becomes smaller compared to the conventional methods. In particular, since the embodiment provides a quantitative evaluation with kinetic energy as a reference in the overall speed range from the low speed range to the high speed range, the embodiment does not excessively reflect action in the low speed range to evaluation, so that the embodiment has little influence on traveling speed to evaluation.

Further, the above-described three evaluation indices A to C are for exemplification, and these are common in that each of them shows a relationship between kinetic energy obtained by an operation target and motion distance, and a relationship between fluctuation of the kinetic energy and motion distance. Therefore, if an evaluation index has this common point, the evaluation index is not restricted to the above-described evaluation index and another evaluation index can be used as evaluation index of the embodiment. For example, inverse numbers of various indices shown as an example in the embodiment can be used as other indices having essential qualities of the above-described invention.

For example, the above-described acceleration energy efficient index A is not a dimensional value which is the same kind of an acceleration energy amount, but is a ratio of an actual acceleration energy amount to ideal acceleration energy amount, and a corresponding value to an injection amount of useless acceleration energy portion of acceleration energy per unit traveling distance can be used as one evaluation index. As shown by the following formula 8, acceleration energy wastefulness index D showing an excess acceleration energy consumption amount per unit traveling distance is given as an example. This index D also has a positive correlation with acceleration energy, and has a negative correlation with (has an inverse proportion to) the traveling distance.

$$D = \sum_{i=1}^{n} [Ei - Emi] \Big/ \sum_{i=1}^{n} Li \quad \text{[Formula 8]}$$

Then, a sum of this acceleration energy wastefulness index D and the above-described sudden acceleration/deceleration index C can be set as still another appropriate driving index E=C+D. Since good/bad conditions of driving can be determined by viewpoints of both modes of consumption amount of acceleration energy and acceleration/deceleration, this appropriate driving index E not only expresses the degree of using simply useless acceleration energy, but also becomes an evaluation index reflecting the degree of sudden operation for making a part of the useless acceleration energy. For example, the appropriate driving index E has a positive correlation to energy amount does not contribute to driving per unit traveling distance, which is a portion of injected acceleration energy. Then, the smaller this numerical value is the less useless acceleration/deceleration and sudden operation, which results in reduction in driving efficiency and energy efficiency.

An acceleration/deceleration comparison index G can be obtained by taking a ratio of two terms of the above-described sudden acceleration/deceleration index C. The acceleration/deceleration comparison index G is expressed by the following formula 9. This acceleration/deceleration comparison index G shows a ratio of sudden acceleration operation amount shown in the numerator of formula 9 and sudden deceleration operation amount shown in the denominator of formula 9, and shows a tendency that acceleration operation is performed more suddenly or frequently than deceleration operation when a value of formula 9 is larger than 1, and a tendency that deceleration operation is performed more suddenly or frequently than acceleration operation when a value of formula 9 is less than 1. If this index G is near to 1, driving is well-balanced and ideal driving is performed.

$$G = \sum_{i=1}^{n} \sum_{j=1}^{m} [Eij / Lij] \Big/ \sum_{i=1}^{n} \sum_{k=1}^{l} [Fik / Lik] \quad \text{[Formula 9]}$$

Further, the above-described respective indices A to E, G are calculated on the assumption that the influence on driving resistance is ignored, and it is not necessary for injecting acceleration energy during constant speed driving. That is, it is assumed that kinetic energy obtained by operation target=injected acceleration energy, and kinetic energy lost from operation target=ejected acceleration energy. However, in order to correct the above-described respective indices by the amount of driving resistance, acceleration energy amount necessary to cope with the driving resistance can be included as a function of traveling speed. Generally, since the driving resistance is a function having a positive correlation with the traveling speed, the acceleration energy amount necessary to cope with the driving resistance is also a function having a positive correlation with the traveling speed. It is considered that a time integrated value (total acceleration energy amount necessary to cope with the driving resistance, or acceleration energy amount necessary to cope with the driving resistance per unit traveling distance) of such an acceleration energy is added to the acceleration energy amount in the above-described indices or the acceleration energy amounts per unit distance.

As described above, since a driving evaluation is performed from the viewpoint of energy efficiency, a case that a person receiving the evaluation performs driving in a mode to intentionally reduce driving efficiency can be prevented in evaluation indices A to E, G in the embodiment. That is, even when the person drives simply slowly, the person cannot raise an evaluation point, instead, reduces it as a result. Specific examples are described below.

The above-described evaluation indices are actually influenced, still slighter than in case of conventional method, by driving conditions such as road environment and traffic environment. In order to make the influence on this driving condition clear, the above-described respective traveling segments are divided by speed bands of average speed, and the above-described environment indices can be obtained by the respective speed bands. This manner allows for grasping whether a driving pattern as an evaluation target is main driving on an open road, expressway, or a route with traffic congestion or not depending on a distribution condition of traveling segment for average speed bands of average speed, and moreover can grasp the tendency of traveling speed of driving operation, by use of an evaluation index by average speed band (for example, stable driving can be performed on an expressway, but useless acceleration operations are frequently performed on route with traffic congestion, or smooth driving operation can be done on an open road, but there are many accelerations/decelerations on an expressway).

Then, the above-described respective indices are calculated basically in a traveling segment unit. However, when traffic environments are greatly different from each other, even when driving is performed with the same driving pattern, respective indices are largely different from each other in some cases. This happens in a case that traveling distance is largely different between traveling segments. For example, on an open road, the traveling distance of the traveling segment becomes several km on average by the influence of a signal, and on an expressway, unless there are no stops and no accidents, traveling distance of a traveling segment becomes long freely, in a range of several ten km to several hundred km on average, so that the overall traveling distance becomes ten times or more of an open road. In this way, the above-described traveling distances are different from each other between traveling segments, especially acceleration energy efficient index A, acceleration energy waste index D, and appropriate driving index E of the above-described indices also largely change, so that their indices are more largely influenced by traffic environments rather than driving patterns by driving operation. Thereupon, as one method described above, indices are evaluated by speed bands of average speed of a traveling segment, but this cannot reduce the influence on the traffic environment from the indices themselves. For this reason, the following method has been devised.

That is, a value of traveling distance Li of traveling segment i divided by predetermined reference traveling distance Lo is set as traveling distance correction coefficient (correspond to the above-described motion distance correction factor) $X_L$, where Li>Lo: $X_L$=Li/Lo (proportional to traveling distance Li), and Li<Lo: $X_L$=1.0. Even in this case, traveling distance correction coefficient $X_L$ has a positive correlation with traveling distance Li in a range where the traveling distance Li is at least a predetermined value Lo or larger. Then, the above-described respective indices are corrected by using this traveling distance correction coefficient $X_L$. Here, it is confirmed that when Lo=10 km, influence of a traffic environment (especially evaluation difference between an open road and expressway) during general driving can be reduced (empirical value). However, a standard traveling distance Lo used in practice can be set to an appropriate value for a driver or vehicle as an evaluation target.

The acceleration energy efficiency index A uses Emi'=Emi·$X_L$ instead of Emi in the above formula 1. In this case, when a traveling distance Li of one traveling segment i exceeds a standard traveling distance Lo, an average speed acceleration energy Emi' is increased corresponding to a ratio of the traveling distance Li to the standard traveling distance Lo. Therefore, when the traveling distance Li becomes longer than the standard traveling distance Lo, a numerical value of the index A becomes small correspondingly. It is because that the average speed acceleration energy Emi' compensates the influence in which generally, when a traveling distance Li becomes long, a rate of the average speed acceleration energy Emi per unit traveling distance decreases, as a result, the index A becomes large.

The acceleration energy waste index D uses Emi'=Emi·$X_L$ instead of Emi in the above formula 8 in the same way as the above-described index A. Also in this case, when a traveling distance Li of one traveling segment exceeds a standard traveling distance Lo, an average speed acceleration energy Emi' increases corresponding to a ratio of the traveling distance Li to the standard traveling distance Lo, therefore, when the traveling distance Li becomes longer than the standard traveling distance Lo, a numerical value of the index D becomes small. In addition, the above-described traveling distance correction coefficient $X_L$ corrects an energy amount as a reference when a traveling distance Li of a traveling segment i becomes larger than a predetermined reference traveling distance Lo, and on the other hand, the energy amount as a reference can be corrected when the traveling distance Li of a traveling segment i becomes the predetermined reference traveling distance Lo (which is different from the above-described value.) or smaller. Then, not only in a case that a traveling distance Li becomes longer than a predetermined value or shorter than the predetermined value, but also in all traveling distances Li, $X_L$=Li/Lo may be used and correction is performed. Then, a correlation of a traveling distance correction coefficient $X_L$ with traveling distance Li (positive or negative correlation, and its correlation degree) is set so that the traveling distance correction coefficient $X_L$ reduces the correlation between each index and traveling distance Li independently of driving pattern and a correction mode for each index (what calculation is performed for what variable) is determined.

Figure 4:
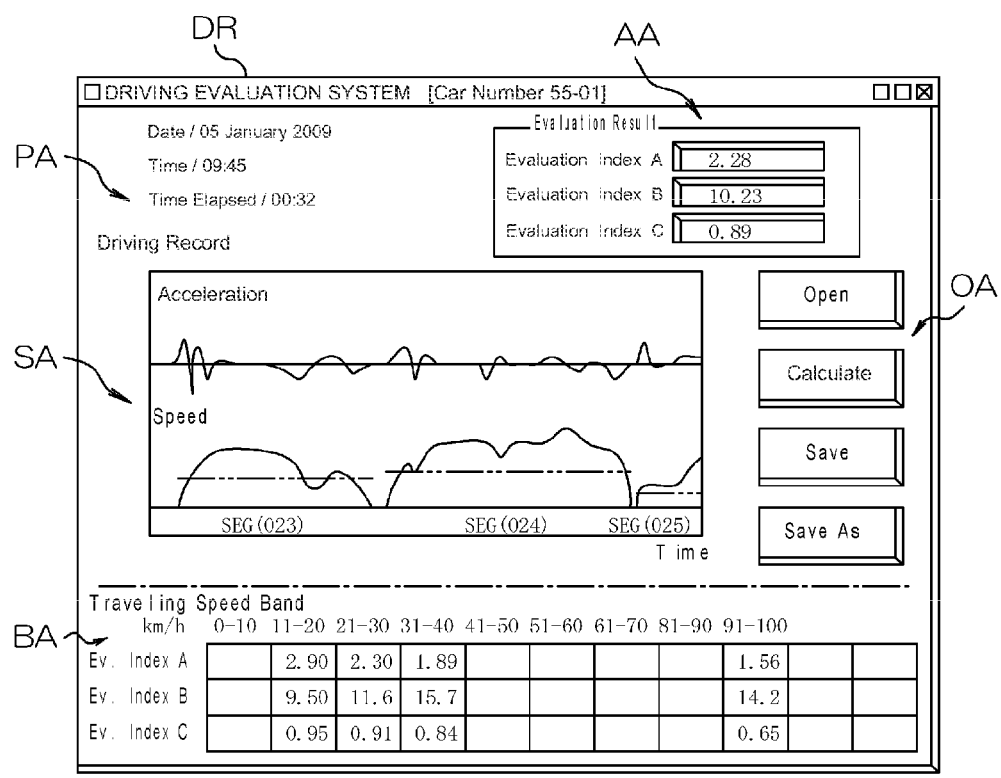
FIG. 4 A figure showing an example of a display mode of an output device of the embodiment.

When calculation of evaluation data AS of the evaluation indices explained above is completed, the evaluation data AS is finally output to an output device 17, and is displayed, for example, on a screen of a display device. FIG. 4 shows an example of display mode of evaluation data displayed on a display. In an illustration example, for example, an administration information display section PA for displaying administration information of driving data, a data display section SA for displaying driving data (speed data and acceleration data) and an evaluation result display section AA for displaying evaluation results are placed in a display region DR by a display mode of windows type. Then, an operation display section OA for display operation buttons and the like are prepared in the display region DR as required.

In addition, the embodiment displays speed data and acceleration data in the data display section SA, but it is only to visually show an injection mode of acceleration energy of driving operation and modes of sudden acceleration/deceleration, and the invention is not restricted to the modes for displaying them. However, when the above-described indices A to E, G of the invention are grasped simply as numerical values, it is difficult for the user to analyze the meaning of the respective indices further and to investigate the reason why the indices can be obtained although a user can grasp the reason why the indices can be obtained by knowing the meaning of the respective indices. Therefore, the time variation of speed data and acceleration data of a driving pattern is visually displayed, and then the user can analyze a more detailed reason why the indices can be obtained.

A display mode may be anything which can express an evaluation result, as described above, and the evaluation result may be displayed by any type of display format such as a graph, not restricted in numerical value. In addition, as described above, when traveling segments are classified by average speed bands and evaluation indices are obtained by the average speed bands, these results can be displayed. For example, in an illustration example, evaluation indices are displayed by using a table with respect to each average speed band of traveling segment, on a detailed result display section BA. Of course, average speed bands and one or a plurality of evaluation indices are graphed to be displayed. Then, displaying an evaluation result by average speed bands for each traveling segment unit, a driving condition that, for example, driving data of an evaluation target is obtained in what traffic environment (such as road environment), can also be grasped.

Figure 6:
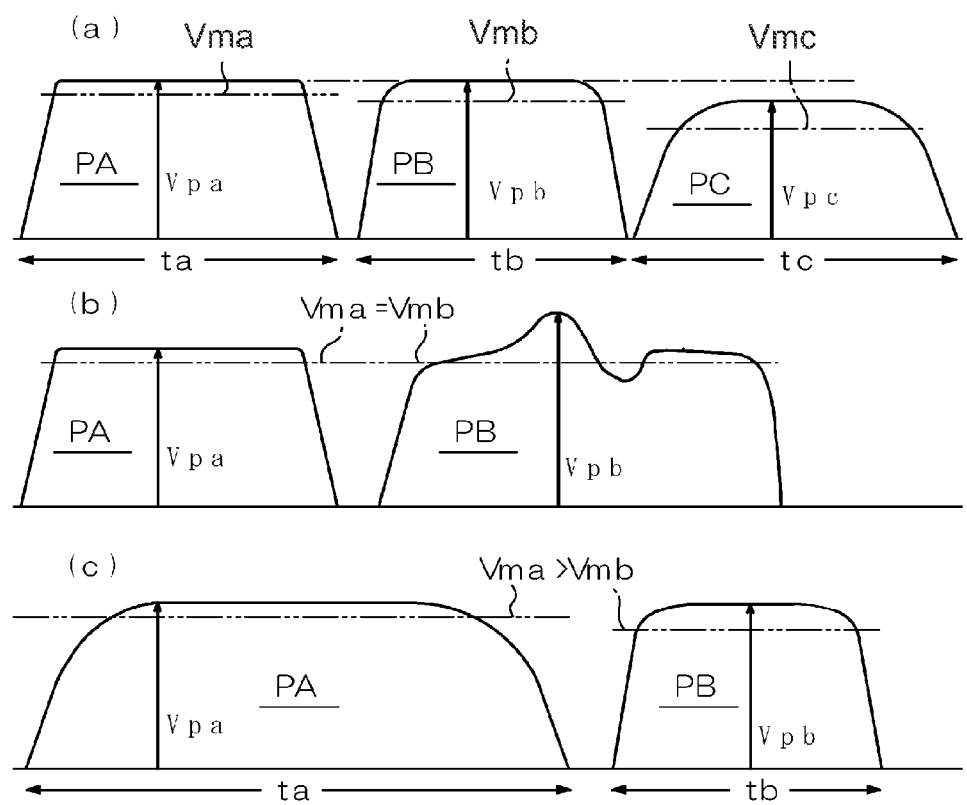
FIG. 6 Explanation diagrams (a) to (c) to compare and show modes of various traveling segments.

FIG. 6 is an illustration showing examples of various driving patterns in a traveling segment. FIG. 6(a) shows a traveling segment having three driving patterns PA, PB, PC which are the same in acceleration/deceleration pattern (once accelerating in initial stage, maintaining constant speed after accelerating, that is cruising, and once decelerating in the end stage) where the respective patterns PA, PB, PC have different cruising speeds (Vpa=Vpb>Vpc) and different driving periods (ta=tc>tb). Then, their average speeds are all different among them (Vma>Vmb>Vmc). In a traveling segment having such a driving pattern, the driving pattern PA with the maximum average speed and also long traveling distance has the minimum acceleration energy efficiency index A, small acceleration energy consumption index B and small sudden acceleration/deceleration index C. That is, a driving pattern with the maximum average speed and long traveling distance consumes the minimum energy to transfer for a constant distance (unit traveling distance) and has good energy efficiency.

Then, as shown FIG. 6(b), in driving patterns PA and PB having the same average speed as each other, with fewer acceleration times, the respective indices become better, and energy efficiency becomes better. Further, in FIG. 6(c), in the same acceleration/deceleration patterns and the same cruising speeds (Vpa=Vpb) of driving patterns PA and PB, when cruising distances are different (ta>tb), the driving pattern PA having longer cruising distance has higher average speed, good respective indices, and high energy efficiency.

Figure 7:
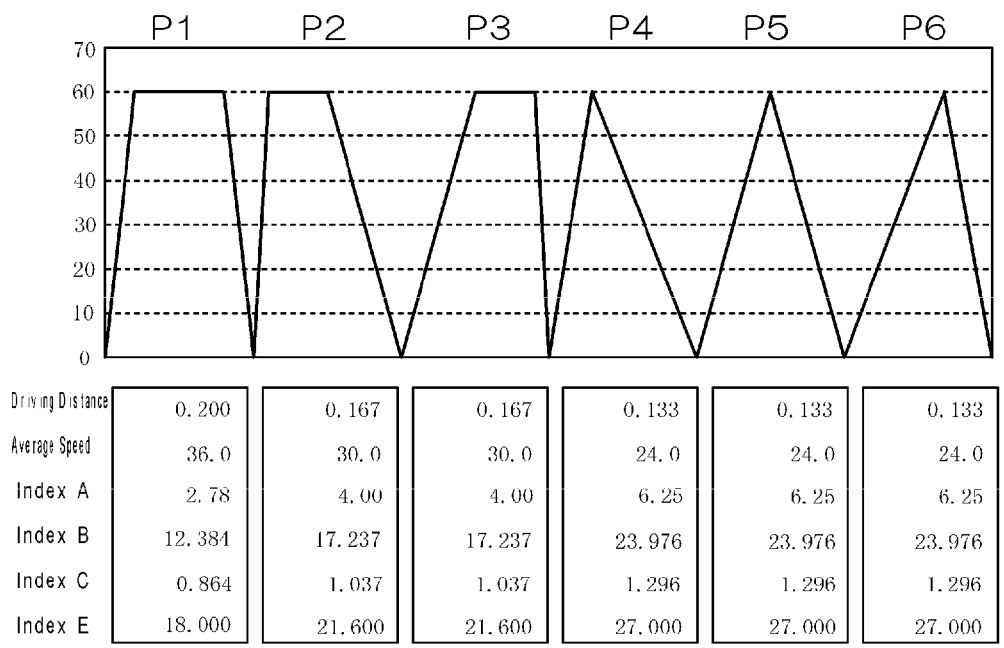
FIG. 7 An explanation diagram to show relationships between a mode of various traveling segments and evaluation indices.

Next, by referring to FIGS. 7 to 10, it is explained how the above-described respective indices change in various driving patterns of one traveling segment. First, as shown in FIG. 7, driving pattern P1 with the simplest acceleration/deceleration pattern is taken as a standard. In driving pattern P2 with higher acceleration in the first acceleration region, same cruising speed, short cruising distance, and small deceleration in the last deceleration region, traveling distance becomes slightly less and average speed slightly lowers, as a result, acceleration energy efficient index A is greatly increased to almost double, and any of acceleration energy consumption index B, sudden acceleration/deceleration index C, and appropriate driving index E is slightly increased. Further, in driving pattern P3 with lower acceleration in the first acceleration region, the same cruising speed and cruising distance as P2, large deceleration in the last deceleration region, and magnitude relation of absolute values of acceleration in acceleration region and deceleration in deceleration region inverted against P2, all of traveling distance, average speed, and evaluation indices of the driving pattern P3 are the same as those of the driving pattern P2.

Moreover, in driving patterns P3, P4, P5 with acceleration/deceleration pattern in which the last deceleration region starts immediately after the first acceleration pattern, there is no cruising period, traveling distance and average speed are reduced compared to the above-described driving patterns P1 to P3, as a result, any of acceleration energy efficiency index A, acceleration energy consumption index B, sudden acceleration/deceleration index C, and appropriate driving index E deteriorates. In this case, in driving patterns P3 to P5, when traveling distance and average speed are not changed, even when the first acceleration and the last acceleration are changed respectively, evaluation indices A to E are not changed respectively.

Figure 8:
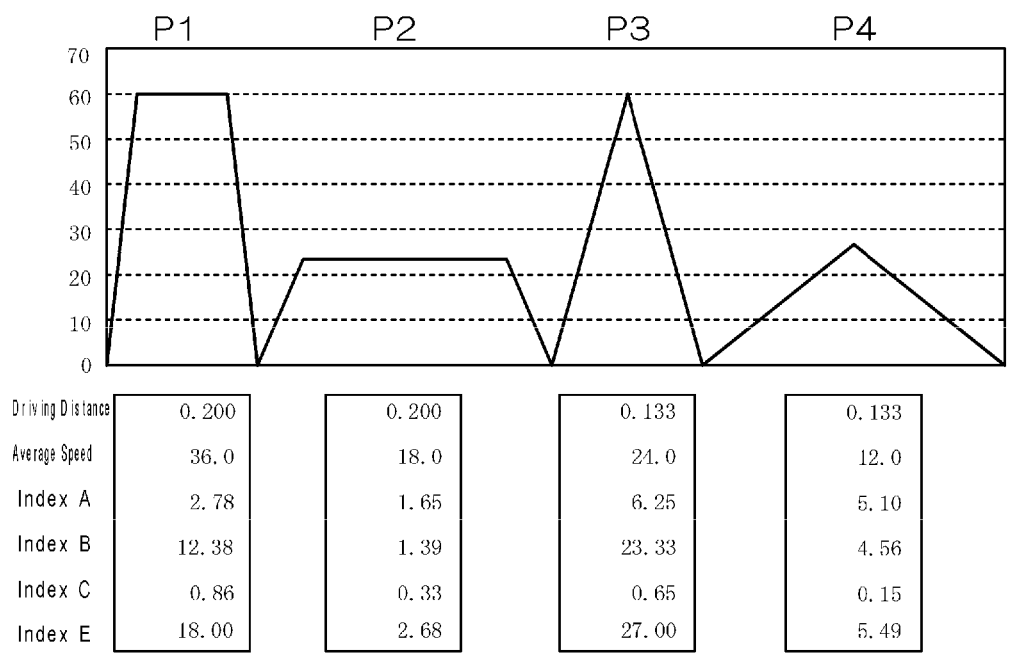
FIG. 8 An explanation diagram to show relationships between a mode of various traveling segments and evaluation indices.

Next, the driving patterns P1 and P2 shown in FIG. 8 are the same in acceleration/deceleration pattern and traveling distance, but different in cruising speed, and largely different in average speed. In this case, the driving pattern P1 with high cruising speed (average speed) and short cruising period has worse respective indices than the driving pattern P2 with low cruising speed (average speed) and long cruising period. The one with longer cruising period has better evaluation indices in tendency. Furthermore, both of driving patterns P3 and P4 have no cruising, that is, an acceleration/deceleration pattern in which the last deceleration region starts immediately after the first acceleration region, and have the same traveling distance. In this case, the driving patterns P3 and P4 do not have cruising period at all so that they have short traveling distance and bad evaluation indices comparing with the driving patterns P1 and P2. Here, driving pattern P3 has large first acceleration and last deceleration and high ultimate speed, but driving pattern P4 has small first acceleration and last deceleration and low ultimate speed. Therefore, driving pattern P3 has higher average speed and worse respective indices than driving pattern P4. In particular, P3 has a significantly worse acceleration energy consumption index B and appropriate driving index E (largely influenced by acceleration energy waste index D (not shown)) than P4.

As described above, in a traveling segment having a relatively simple driving pattern, that is, only having the first acceleration region and the last deceleration region, it is understood that energy efficiency becomes high and the above-described respective evaluation indices improve, by performing driving in a mode that speed attains quickly to the cruising speed and the cruising speed is refrained moderately and maintained as long as possible. Such a driving mode is similar to the driving method of a driver when measuring drive fuel consumption of a commercial vehicle generally and is ideal in that it does not reduce movement efficiency and can provide driving with low fuel consumption and safety.

Figure 9:
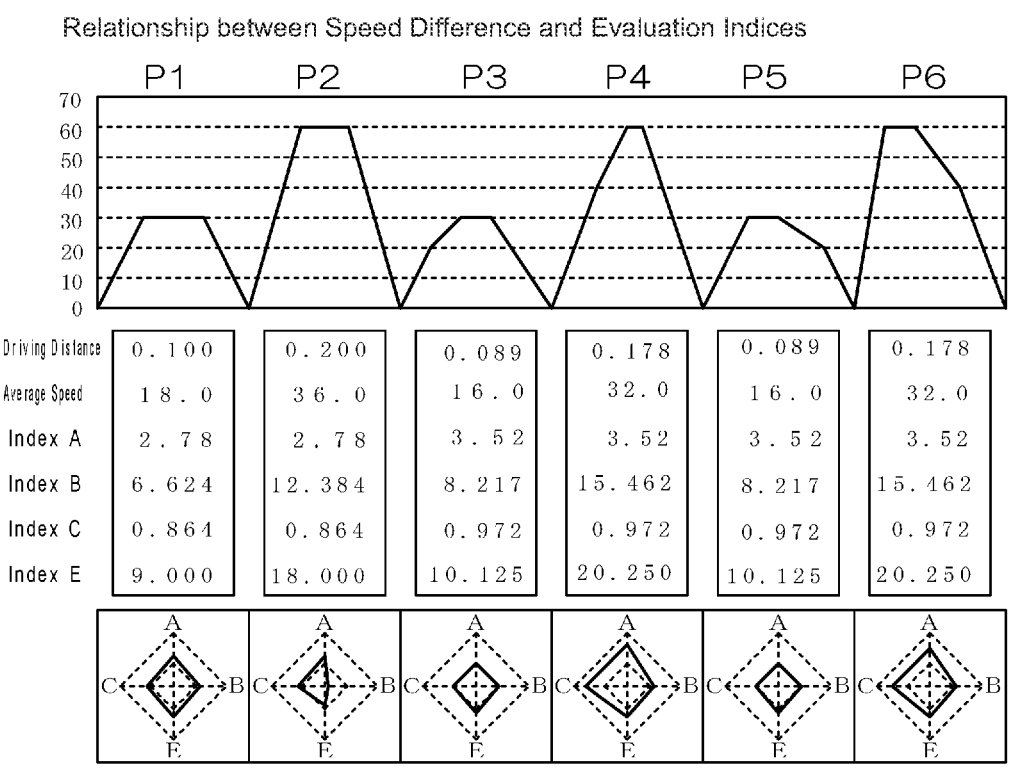
FIG. 9 An explanation diagram to show driving patterns expressing an influence on differences of traveling speed to an evaluation index in a traveling segment, their evaluation indices, and radar charts of the evaluation indices.

FIG. 9 shows driving pattern pairs P1-P2, P3-P4, P5-P6, each of which includes two driving patterns has the same acceleration/deceleration and cruising patterns, the same driving period, but one is twice of the other in the cruising speed. Here, P1 and P2 are the simplest patterns having the first acceleration region, cruising region, and the last deceleration region. On the other hand, P3 and P4 are different from this in that acceleration is reduced in the middle of the first acceleration region, and P5 and P6 are different from this in that deceleration is increased in the middle of the last acceleration region. In any pair of driving patterns, cruising speed, acceleration, and deceleration of one driving pattern are set to twice these of the other driving pattern. It is understood from these evaluation results that acceleration energy efficiency index A and sudden acceleration/deceleration index C are not changed, and acceleration energy consumption index B and appropriate driving index E become twice due to the same accelerations/decelerations patterns and the same cruising patterns even when speeds and accelerations become twice. In addition, since driving periods are the same and speeds and accelerations become twice, traveling distances and average speeds also become twice. That is, these indices A and C are difficult to be influenced by absolute values of speed and acceleration, therefore, it can be expressed whether pattern shapes of accelerations/decelerations and cruising in driving themselves are good or bad. On the other hand, since the indices B and E have correlation with absolute value of energy amount, the indices B and E can express the degree of safety and energy saving.

Figure 10:
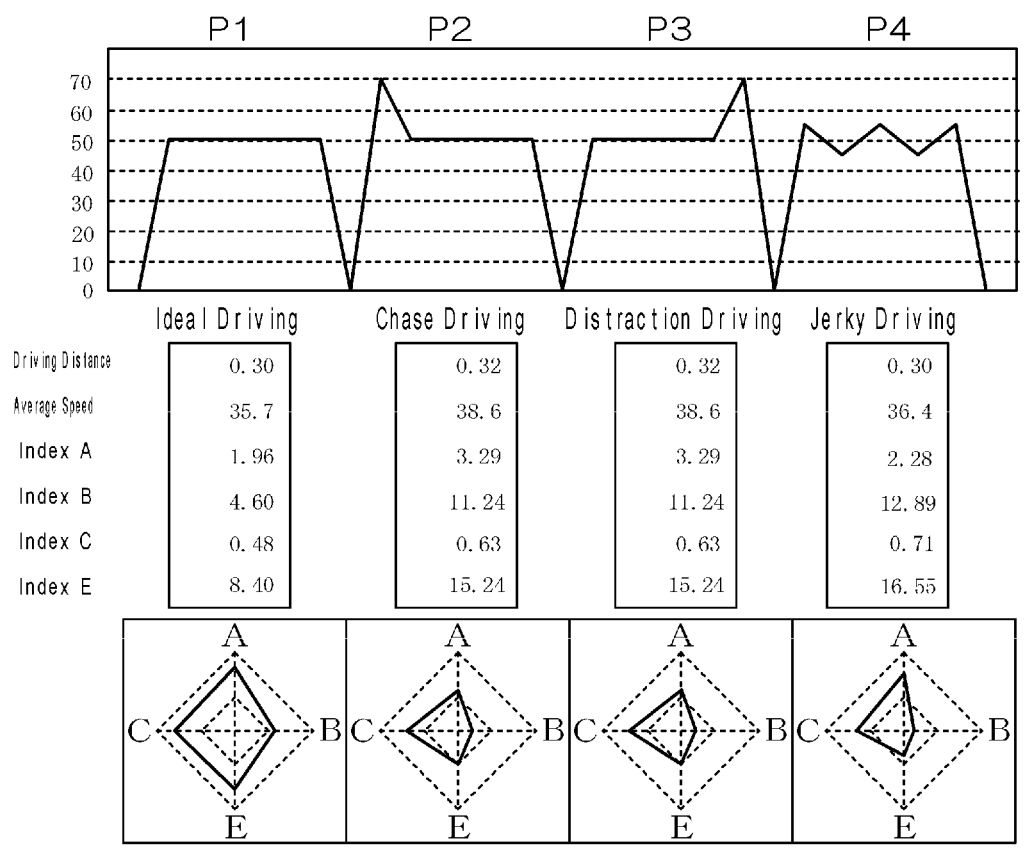
FIG. 10 An explanation diagram to show driving patterns of bad energy efficiency, their evaluation indices, and radar charts of the evaluation indices.

FIG. 10 shows examples of typical driving patterns, that is, ideal driving pattern P1, chase driving pattern P2, distraction driving pattern P3, and jerky driving pattern P4. When compared to an ideal driving pattern P1, any of other driving patterns P2 to P4 shows undesirable inclination, and any of the indices deteriorates. The driving pattern P2 is a pattern that a vehicle goes into a cruise after decreasing a speed since a speed of this vehicle is increased too high at a first acceleration and this vehicle must decelerate owing to other vehicles running ahead of this vehicle. The driving pattern P3 is a pattern that acceleration is performed before the vehicle goes into deceleration action to stop. The driving pattern P4 is a pattern that cruising speed is not stabilized, increased and decreased, and uncertain.

Figure 11:
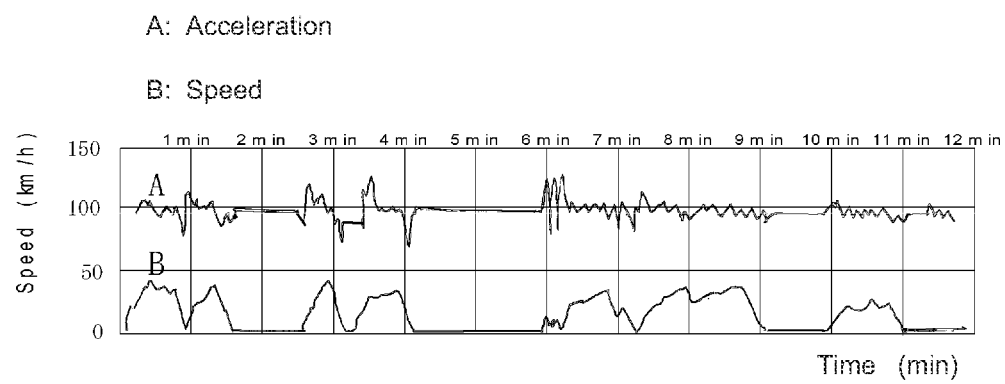
FIG. 11 A chart showing actual driving data 1.

Finally, calculation examples of evaluation indices are explained based on the actual driving data. FIG. 11 to FIG. 17 are graphs which show driving data (acceleration data A and deceleration data B) when a car is driven in practice. Driving data 1 shown in FIG. 11 is acceleration energy efficiency index A=2.98, acceleration energy consumption index B=4.77, sudden acceleration/deceleration index C=0.64, and appropriate driving index E=3.68. Driving period is 417 sec, traveling distance is 2.9 km, average speed is 25.1 km/h, and segment number is 12.

Figure 12:
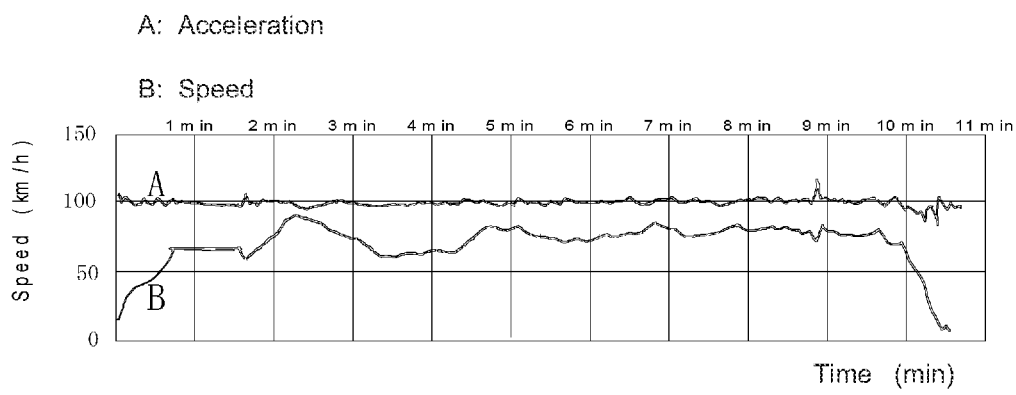
FIG. 12 A chart showing actual driving data 2.

On the other hand, driving data 2 shown FIG. 12 is acceleration energy efficiency index A=5.03, acceleration energy consumption index B=1.95, sudden acceleration/deceleration index C=0.11, and appropriate driving index E=1.67. Driving period is 639 sec, traveling distance is 12.2 km, average speed is 68.8 km/h, and segment number is 1. In this case, when compared to FIG. 11, one driving segment is long, but acceleration/deceleration is repeated in the driving segment, therefore it is considered that useless acceleration energy unnecessary for driving is injected, and the index A deteriorates. However, starts and stops are few, so that the indices B and E are small, and consumption energy amount itself is little. There is no sudden acceleration/deceleration operation, so that the index C is also small. Therefore, since the road environment itself is not so bad, fuel consumption is good at first sight, but, since the car does not cruise at a constant speed, it is not evaluated that driving is efficient and ideal. Further, in this case, deterioration factors caused by speed changes in cruising is significant as described above, but furthermore the traveling distance becomes longer, so that the acceleration energy efficiency index A is increased more than a value caused by a factor of the actual driving pattern. However, by using the above-described traveling distance correction coefficient $X_L$, influences caused by traveling distance can be reduced.

Figure 13:
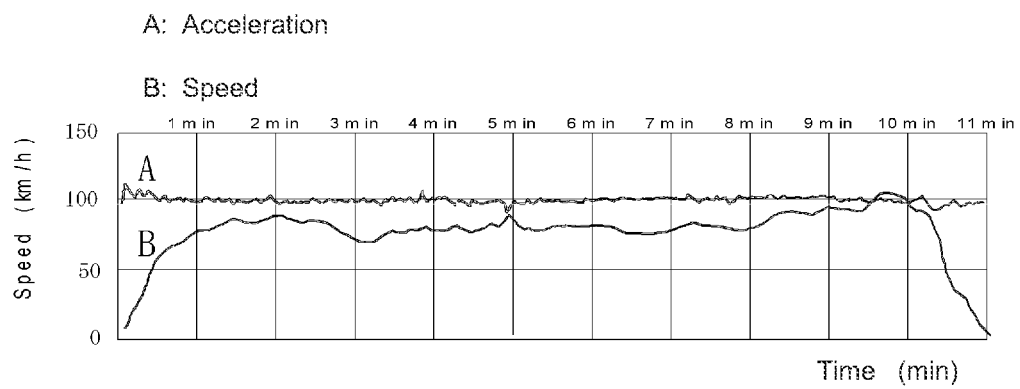
FIG. 13 A chart showing actual driving data 3.

In driving data 3 shown in FIG. 13, acceleration energy efficiency index A=4.54, acceleration energy consumption index B=1.94, sudden acceleration/deceleration index C=0.11, and appropriate driving index E=1.62. Driving period is 657 sec, traveling distance is 14.1 km, average speed is 77.5 km/h, and segment number is 2. In this case, when compared to FIG. 12, since speed changes in cruising are few, the acceleration energy efficiency index A becomes slightly small. As to reasons why the index A is not more drastically reduced than a case of FIG. 12, it is considered that the influence on speed changes becomes large since average speed is higher than a case of FIG. 12 by 9 km/h, and useless acceleration is performed before deceleration of the final stage. On the other hand, there is almost no difference with other indices B, C, and E from the case of FIG. 12. Even in this case, influences caused by the driving pattern itself can be discriminated more clearly by using the traveling distance correction coefficient $X_L$ as described above.

Figure 14:
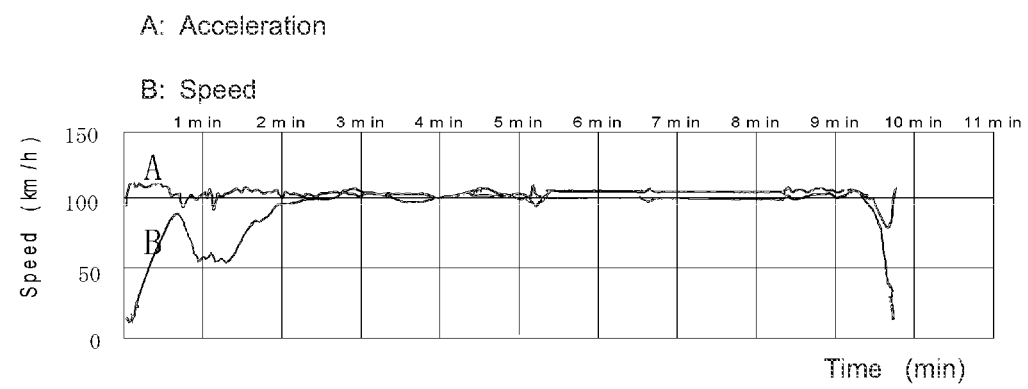
FIG. 14 A chart showing actual driving data 4.

In driving data 4 shown in FIG. 14, acceleration energy efficiency index A=3.47, acceleration energy consumption index B=1.89, sudden acceleration/deceleration index C=0.07, and appropriate driving index E=1.42. Driving period is 585 sec, traveling distance is 14.4 km, average speed is 88.6 km/h, and segment number is 1. In this case, there is an increase and decrease in speed at the beginning, but after that, cruising speed is constant and speed changes are few, so that the acceleration energy efficiency index A becomes smaller than a case shown in FIG. 13. In addition, other indices are slightly reduced than a case shown in FIG. 13.

Figure 15:
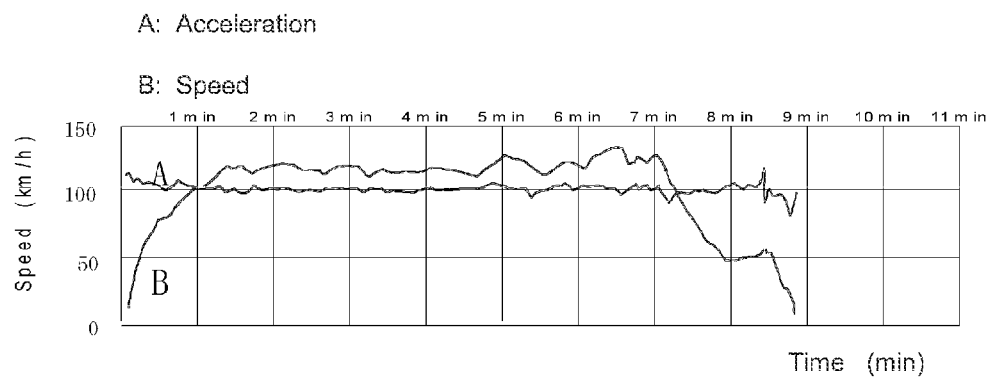
FIG. 15 A chart showing actual driving data 5.

In driving data 5 shown in FIG. 15, acceleration energy efficiency index A=3.67, acceleration energy consumption index B=2.52, sudden acceleration/deceleration index C=0.07, and appropriate driving index E=1.90. Driving period is 525 sec, traveling distance is 14.6 km, average speed is 100.3 km/h, and segment number is 1. In this case, average speed becomes higher and traveling distance becomes long, so that there are speed changes in cruising, but the acceleration energy efficiency index becomes even smaller. Even in this case, influences caused by the driving pattern itself can be discriminated more clearly by using the traveling distance correction coefficient $X_L$ as described above. On the other hand, acceleration energy consumption index B and appropriate driving index E deteriorate. Since acceleration and deceleration are small, even when speed changes exist and sudden acceleration/deceleration index C changes extremely little.

Figure 16:
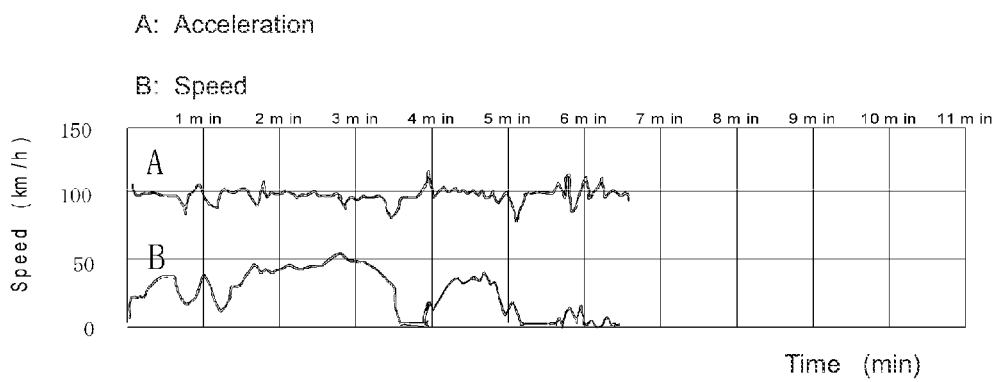
FIG. 16 A chart showing actual driving data 6.

In driving data 6 shown in FIG. 16, acceleration energy efficiency index A=5.33, acceleration energy consumption index B=3.89, sudden acceleration/deceleration index C=0.32, and appropriate driving index E=3.43. Driving period is 316 sec, traveling distance is 2.9 km, average speed is 33.4 km/h, and segment number is 5. In this case, there are many small speed changes in a low speed region and useless energy is injected, so that the respective indices deteriorate. In this case, since the traveling distance is significantly shorter than other driving patterns shown in FIG. 12 to FIG. 15, by using the above-described traveling distance correction coefficient $X_L$ for another driving pattern and comparing this driving pattern with it, comparison of influences caused by the driving pattern itself can be performed more clearly.

In driving data 7 shown in FIG. 17, acceleration energy efficiency index A=3.31, acceleration energy consumption index B=4.14, sudden acceleration/deceleration index C=0.23, and appropriate driving index E=3.13. Driving period is 853 sec, traveling distance is 8.8 km, average speed is 37.3 km/h, and segment number is 12. In this case, speed change is relatively less in the later segments even in a low speed band indices A and C are improved than in a case shown in FIG. 16. Indices B and E are not so good because of frequent acceleration times, but are favorable comparing with a case shown in FIG. 11. Even in this case, by using the traveling distance correction coefficient $X_L$ as described above, influences caused by the driving pattern itself can be discriminated more clearly.

Further, the driving evaluation method of the invention is not limited to illustration examples described above, and can be modified variously in a range not deviated from the gist of the invention. For example, instead of the respective indices shown in the above-described embodiments, the summation values of these indices and positive or negative constants or the multiplication values of these indices and positive or negative constants may be used. In addition, in the above-described embodiment, actual speed data is obtained based on GPS data and evaluation indices are derived from the actual speed data, but the evaluation indices may be derived from driving data obtained from various sensors such as the position sensor and speed sensor or various data calculated therefrom. Furthermore, the above described indices are fundamentally calculated in a traveling segment as a unit, but instead of a traveling segment as a unit, overall through sufficient traveling distance, acceleration energy, traveling distance, energy increase/decrease rate per traveling distance, and the like are calculated as basic data, and the equivalent evaluation can be performed by deriving the values equivalent to the respective indices based on these. In particular, with respect to the indices B, C, C1, C2, and G, numerical values of significance corresponding to their calculation ranges can be obtained respectively even when the segment is ignored.

DESCRIPTION OF SYMBOLS

10 . . . driving evaluation system, 12 . . . MPU, 13 . . . GPS, 17 . . . output device, S1 . . . driving data, S2 . . . actual speed data, SP . . . data elementary file, CB . . . basic data, AS . . . evaluation data

What is claimed is:

1. A driving evaluation method for focusing on how much kinetic energy of a mobile body is converted into a traveling distance of the mobile body, and for calculating an evaluation index on the basis of motion data (S1, S2) of the mobile body to perform a driving evaluation, wherein
the evaluation index (A, B, D, E) is calculated, by a processor, from the motion data,
in which the evaluation index (A, B, D, E) is a function of acceleration energy (Ei) injected into the mobile body and a motion distance (Li) of the mobile body corresponding to the acceleration energy, and has a positive correlation with one of the acceleration energy and the motion distance and has a negative correlation with the other,
on the condition that the acceleration energy (Ei) and the motion distance (Li) are calculated for each of one or a plurality of moving segments (i), and wherein each of the moving segments (i) is the period from a start of the mobile body to a stop in a sequence of travel of the mobile body which includes repeated starting and stopping, and
the acceleration energy (Ei) is a sum of each acceleration energy (Eij) in each of the moving segments (i), and
each acceleration energy (Eij) is calculated by multiplying a mass of the mobile body (M) by a difference between a square of a final speed ($Vbj^2$) and a square of an initial speed ($Vaj^2$) through each acceleration region in each moving segment, (Eij=M*($Vbj^2$−$Vaj^2$)), and
the motion distance (Li) is a traveling distance of the mobile body corresponding to the each of the moving segments (i).

2. The driving evaluation method according to claim 1, wherein the evaluation index (A, B) is a function which is in proportion to or inverse proportion to the acceleration energy (Ei).

3. The driving evaluation method according to claim 1, wherein:
the evaluation index is an acceleration energy efficiency index (A) and
the acceleration energy efficiency index (A) indicates
a ratio of a kinetic energy (Emi) of the mobile body having an average moving speed (Vmi) in each of the moving segments (i), which is from a start of the mobile body to a first stop, to the acceleration energy (Ei) injected into the mobile body in each of the moving segments (i), or
an additional value or multiplication value of a positive or negative constant to the ratio,
on the condition that the kinetic energy (Emi) is calculated for each of the moving segments (i) and is calculated by multiplying the mass of the mobile body (M) by a square of the average moving speed ($Vmi^2$) throughout each of the moving segments, (Emi=M*$Vmi^2$).

4. The driving evaluation method according to claim 3, wherein
the acceleration energy efficiency index throughout a plurality of the moving segments is calculated by a sum of acceleration energy efficiency indices on the plurality of the moving segments which are weighted by motion distances of the mobile body in the moving segments as weighting factors.

5. The driving evaluation method according to claim 4, wherein the acceleration energy efficiency index (A) is calculated by using a motion distance correction factor ($X_L$) for reducing an influence of the motion distance (Li) on the acceleration energy efficiency index (A) at least in a range that the motion distance (Li) is equal to or longer than a predetermined value or at least in a range that the motion distance (Li) is equal to or shorter than the predetermined value.

6. The driving evaluation method according to claim 3, wherein the acceleration energy efficiency index (A) is calculated by using a motion distance correction factor ($X_L$) for reducing an influence of the motion distance (Li) on the acceleration energy efficiency index (A) at least in a range that the motion distance (Li) is equal to or longer than a predetermined value or at least in a range that the motion distance (Li) is equal to or shorter than the predetermined value.

7. The driving evaluation method according to claim 1 wherein
the evaluation index is an acceleration energy waste index (D) and
the acceleration energy waste index (D) indicates
a ratio of a difference value (Ei−Emi) representing a difference between the acceleration energy (Ei) injected into the mobile body in each of the moving segments (i, and a kinetic energy (Emi) of the mobile body having an average moving speed (Vmi) in each of the moving segments (i), to one of:
(a) the motion distance (Li) of the mobile body in each of the moving segments (i), or
(b) a sum of the ratios when there is a plurality of the moving segments, or
(c) an additional value or multiplication value of a positive or negative constant to the ratio or the sum,
on the condition that the kinetic energy (Emi) is calculated for each of moving segments (i) and is calculated by multiplying the mass of the mobile body (M) by a square of the average moving speed (Vmi$^2$) throughout each of the moving segments, (Emi=M*Vmi$^2$).

8. The driving evaluation method according to claim 7, wherein the acceleration energy waste index (D) is calculated by using a motion distance correction factor ($X_L$) for reducing an influence of the motion distance (Li) on the acceleration energy waste index (D) at least in a range that the motion distance (Li) is equal to or longer than a predetermined value or at least in a range that the motion distance (Li) is equal to or shorter than the predetermined value.

9. The driving evaluation method according to claim 1, wherein:
the evaluation driving index (E) is a sum (C+D) of an acceleration energy waste index (D) and a sudden acceleration/deceleration index (C),
on the condition that the acceleration energy waste index (D) in one or a plurality of moving segments indicates
a ratio of a difference value (Ei−Emi) representing a difference between the acceleration energy (Ei) injected into the mobile body in each of the moving segments (i), and a kinetic energy (Emi) of the mobile body having an average moving speed (Vmi) in the each of the moving segments (i), to one of:
(a) the motion distance (Li) of the mobile body, or
(b) a sum of the ratios when there is a plurality of the moving segments, or
(c) an additional value or multiplication value of a positive or negative constant to the ratio or the sum, and
the kinetic energy (Emi) is calculated for each of the moving segments (i) and is calculated by multiplying the mass of the mobile body (M) by a square of the average moving speed (Vmi$^2$) throughout each of the moving segments, (Emi=M*Vmi$^2$), and
on the condition that the sudden acceleration/deceleration index (C) in one or a plurality of the moving segments indicates
a sum of a sudden acceleration operation amount representing a ratio of an acceleration energy (Eij) injected in an acceleration region to an acceleration distance (Lij), and a sudden deceleration operation amount representing a ratio of a deceleration energy (Fij) ejected in a deceleration region to a deceleration distance (Lik), and
an additional value or multiplication value of a positive or negative constant to the sum of the sudden acceleration operation amount and the sudden deceleration operation amount.

10. The driving evaluation method according to claim 9, wherein the appropriate driving index (E) is calculated by using a motion distance correction factor ($X_L$) for reducing an influence of the motion distance (Li) on the appropriate driving index (E) at least in a range that the motion distance (Li) is equal to or longer than a predetermined value or at least in a range that the motion distance (Li) is equal to or shorter than the predetermined value.

11. The driving evaluation method according to claim 1, wherein the evaluation index is an acceleration energy consumption index (B) and
the acceleration energy consumption index (B) indicates
a ratio of the acceleration energy (Ei) injected into the mobile body to the motion distance (Li) of the mobile body, or
an additional value or multiplication value of a positive or negative constant to the ratio.

12. The driving evaluation method according to claim 11, wherein the acceleration energy consumption index (B) indicates
a ratio of the acceleration energy (Ei) to the motion distance (Li) in each of the moving segments (i), or
a sum of the ratios when there is a plurality of the moving segments, or
an additional value or multiplication value of a positive or negative constant to the ratio or the sum.

13. A driving evaluation method for focusing on how much kinetic energy of a mobile body is converted into a traveling distance of the mobile body, and for calculating an evaluation index on the basis of motion data (S1, S2) of the mobile body to perform a driving evaluation, wherein the period from a start of the mobile body to a stop in a sequence of travel of the mobile body which includes repeated starting and stopping defines one or a plurality of moving segments (i) and wherein
a sudden acceleration index (C1) or sudden deceleration index (C2) is calculated, by a processor, from the motion data,
on the condition that the sudden acceleration index (C1) indicates one of:
(a) a ratio of a sudden acceleration operation amount to a motion distance (Li) of the mobile body, or
(b) an additional value or multiplication value of a positive or negative constant to the ratio; and
the sudden acceleration operation amount represents
a ratio of an acceleration energy (Eij) injected to one or a plurality of acceleration regions in each of the of moving segments, to one of:
(c) an acceleration distance (Lij) corresponding to the acceleration energy, or
(d) a sum of the acceleration ratios when there is a plurality of acceleration regions in each of the moving segments, and
the sudden deceleration index (C2) indicates a ratio of a sudden deceleration operation amount to one of:
(e) the motion distance (Li) of the mobile body, or
(f) an additional value or multiplication value of a positive or negative constant to the ratio, and
the sudden deceleration operation amount represents
a ratio of a deceleration energy (Fij) ejected in one or a plurality of deceleration regions in each of the moving segments, to one of:
(g) a deceleration distance (Lik) corresponding to the deceleration energy, or
(h) a sum of the deceleration ratios when there is a plurality of deceleration regions in each of the moving segments, and the acceleration energy (Eij), the acceleration distance (Lij), the deceleration energy (Fij), and the deceleration distance (Lik) are calculated for each of the moving segments (i), and the acceleration energy (Eij) is calculated by multiplying a mass of the mobile body (M) by a difference between a square of a final speed ($Vbj^2$) and a square of an initial speed ($Vaj^2$) through each acceleration region in each of the moving segments, (Eij=M*($Vbj^2$−$Vaj^2$)), and the acceleration distance (Lij) is a traveling distance of the mobile body corresponding to each acceleration region, and the deceleration energy (Fij) is calculated by multiplying a mass of the mobile body (M) by a difference between a square of an initial speed ($Vak^2$) and a square of a final speed ($Vbk^2$) through each deceleration region in each of the moving segments, (Fij=M*($Vak^2$−$Vbk^2$)), and the deceleration distance (Lik) is a traveling distance of the mobile body corresponding to the each deceleration region.

14. The driving evaluation method according to claim 13, wherein the sudden acceleration index (C1), the sudden deceleration index (C2), or a sudden acceleration/deceleration index (C) is calculated, on the condition that the sudden acceleration index (C1) indicates a ratio of the sudden acceleration operation amount to one of:
  (a) the motion distance (Li) in each of the moving segments (i), or
  (b) a sum of the ratios when there is a plurality of the moving segments, and the sudden deceleration index (C2) indicates a ratio of the sudden deceleration operation amount to one of:
  (c) the motion distance (Li) in each of the moving segments (i), or
  (d) a sum of the ratios when there is a plurality of the moving segments, and the sudden acceleration/deceleration index (C) indicates a sum of the sudden acceleration index and the sudden deceleration index.

15. A driving evaluation method for focusing on that how much kinetic energy of a mobile body is converted into a traveling distance of the mobile body, and for calculating an evaluation index on the basis of motion data (S1, S2) of a mobile body to perform a driving evaluation, wherein the period from a start of the mobile body to a stop in a sequence of travel of the mobile body which includes repeated starting and stopping defines a plurality of moving segments (i) and wherein an acceleration/deceleration comparison index (G) is calculated, by a processor, from the motion data, on the condition that the acceleration/deceleration comparison index (G) indicates a ratio of a sudden acceleration operation amount to a sudden deceleration operation amount, or an additional value or multiplication value of a positive or negative constant to the ratio, and the sudden acceleration operation amount denotes a ratio of an acceleration energy (Eij) injected in one or a plurality of acceleration regions in each of the moving segments, to an acceleration distance (Lij) corresponding to the acceleration energy, or a sum of the acceleration ratios when there is a plurality of acceleration regions in each of the moving segments, and the sudden deceleration operation amount denotes a ratio of a deceleration energy (Fij) ejected in one or a plurality of deceleration regions in each of the moving segments, to a deceleration distance (Lik) corresponding to the deceleration energy, or a sum of the deceleration ratios when there is a plurality of deceleration regions, in each of the moving segments, and the acceleration energy (Eij), the acceleration distance (Lij), the deceleration energy (Fij), and the deceleration distance (Lik) are calculated for each of the moving segments (i), and the acceleration energy (Eij) is calculated by multiplying a mass of the mobile body (M) by a difference between a square of a final speed ($Vbj^2$) and a square of an initial speed ($Vaj^2$) through each acceleration region in each of the moving segments, (Eij=M*($Vbj^2$−$Vaj^2$)), and the acceleration distance (Lij) is a traveling distance of the mobile body corresponding to the each acceleration region, and the deceleration energy (Fij) is calculated by multiplying the mass of the mobile body (M) by a difference between a square of an initial speed ($Vak^2$) and a square of a final speed ($Vbk^2$) through each deceleration region in each of the moving segments, (Fij=M*($Vak^2$−$Vbk^2$)), and the deceleration distance (Lik) is a traveling distance of the mobile body corresponding to each deceleration region.

* * * * *